Print-out Emulsion formed of Silver Hydroxide-Organic Alkali Complex and a Halide, containing a Hydrazine or Hydroxylamine Salt
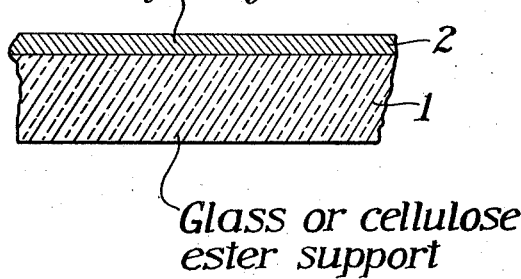
Glass or cellulose ester support
George E. Fallesen
Burt H. Carroll
INVENTORS Patented Aug. 9, 1938

2,126,319

UNITED STATES PATENT OFFICE 2,126,319

PRINT-OUT EMULSION

George E. Fallesen and Burt H. Carroll, Rochester, N. Y., assignors to Eastman Kodak Company, Rochester, N. Y., a corporation of New Jersey Application February 9, 1937, Serial No. 124,866

12 Claims. (Cl. 95—7)

This invention relates to photographic material and more particularly to a print-out photographic emulsion having increased sensitivity to light.

Of the two types of commonly used photographic emulsions, known respectively as developing emulsions and print-out emulsions, the present invention relates primarily to the latter type. In these emulsions, a visible image is produced directly by the action of light, as compared with developing emulsions in which the image is rendered visible, after exposure, by treatment with a developing solution.

In U. S. Patent No. 2,030,860, granted February 18, 1936, to C. J. Staud and G. E. Fallesen, there was disclosed a method for making a highly sensitive print-out emulsion. According to the invention disclosed therein, the print-out emulsion was produced by precipitating silver hydroxide with ammonia from a silver nitrate solution, dissolving the precipitate in an organic base, mixing this solution with a carrier such as gelatin and adding to it a halide such as potassium bromide. To the emulsion thus formed, there could be added a further quantity of silver nitrate or an additional amount of sodium nitrite, which results in an increased sensitivity.

It was found that when the emulsions made according to our prior patent were coated on glass or cellulose ester supports, the sodium nitrite exhibited a tendency to crystallize out. A further disadvantage of the sodium nitrite was that it tended to weaken the gelatin in the emulsion, thereby increasing the difficulties of coating on glass or cellulose ester supports. Although a coating of the emulsion with excess silver nitrate could be made on glass without crystallization ensuing, there was found to be an appreciable loss of print-out sensitivity without the sodium nitrite.

It is, therefore, an object of the present invention to provide a highly sensitive print-out emulsion which may be coated on a cellulose ester or glass support without objectionable crystallization of the emulsion constituents. A further object is to provide a print-out emulsion which may be easily coated on glass or cellulose ester supports.

These objects are accomplished by substituting an organic or inorganic acid salt of hydrazine or hydroxylamine for sodium nitrite and excess silver nitrate in the emulsion of the prior patent of Staud and Fallesen, No. 2,030,860.

In the accompanying drawing, the single figure is a sectional view of a film or plate formed according to our invention.

The materials which we use instead of sodium nitrite and excess silver nitrate in the emulsion of the prior patent, No. 2,030,860, consist of organic or inorganic salts of hydrazine and hydroxylamine. We prefer to use hydrazine sulfate and hydroxyl amine hydrochloride, although other organic or inorganic salts of these compounds may be used.

The following examples illustrate methods of forming highly sensitive print-out emulsions suitable for coating on glass or cellulose ester supports according to our invention:

Example I

Three solutions are made up as follows:

Solution A is formed by dissolving 100 grams of silver nitrate in 300 cc. of water and adding to this solution 20 cc. of ammonium hydroxide (28% concentration). A precipitate of silver hydroxide is formed and this is redissolved in 140 cc. of pyridine.

Solution B consists of 65 grams of sodium chloride in 252 cc. of water.

Solution C consists of 152 grams of gelatin in 3000 cc. of water.

To make up the emulsion from these solutions one-half of C is poured into A and the other half of C is poured into B. AC and BC are then poured together at 40° C. The temperature of the mixture is gradually raised until it reaches 75° C. at the end of 15 minutes. The mixture is then rapidly chilled to 35° C., set and shredded. The emulsion is washed for one hour and allowed to drain. 30 grams of gelatin are then added and dissolved at 40° C. A solution of 4 grams of hydrazine sulphate in 160 cc. of water is then added and the emulsion chilled to coating temperature.

Example II

An emulsion is made up as in Example I. After adding the 30 grams of gelatin at 40° C., a solution of 4 grams of hydroxylamine hydrochloride in 160 cc. of water is added and the emulsion chilled to coating temperature as before.

In addition to pyridine, other organic bases or alkalies may be used to dissolve the silver hydroxide precipitate. These include the amines, such as methylamine, benzylamine, naphthylamine, and triethanolamine; heterocyclic nitrogen bases such as pyridine, piperidine, quinoline, (in methyl alcohol), acridine (in methyl alcohol), and α-picoline; amides such as acetamide. As halides, we have found that both potassium bromide and sodium chloride, with or without further addition of potassium iodide, are satisfactory.

As disclosed in the Staud and Fallesen Patent

No. 2,030,860, the gelatin used to disperse the sensitive salt may be replaced by cellulose mixed esters such as cellulose acetate phthalate. In the present case, the halide used to form the sensitive salt may be replaced by bromacetic acid or other halogenated aliphatic acids or with other bromide or halide substituted compounds, such as bromo-esters, in the manner disclosed in our prior patent.

In the single figure of the accompanying drawing, we have shown in sectional view a photographic element formed according to our invention. As shown therein, 1 is the support of glass or a cellulose ester and 2 is the sensitive emulsion formed according to our process.

The emulsions formed according to our invention coat out as pure white layers. When exposed to light, the emulsions produced with hydrazine salts produce a deep violet density and those formed with hydroxylamine salts produce a deep lavender blue density. The colors formed are much more intense than can be produced by a print-out emulsion of the same formula without the hydrazine or hydroxylamine salts. The sensitivity of the emulsions formed according to our invention is about the same as that of the emulsion of Fallesen and Staud U. S. Patent No. 2,030,860. In addition to being used as print-out emulsions, the emulsions formed according to our invention may also be developed.

It is to be understood that the examples included in the above specifications are illustrative only and that our invention comprises all modifications and equivalents coming within the scope of the appended claims.

We claim:

1. A process of producing a light-sensitive emulsion which comprises precipitating silver hydroxide in an aqueous solution, dissolving the precipitate in an organic alkali, mixing the solution with an inert carrier therefor and adding an alkali metal halide to the mixture to form an emulsion, and then adding approximately 2.2%, based on the weight of inert carrier, of salt selected from the group consisting of hydroxylamine and hydrazine salts.

2. A process of producing a light-sensitive emulsion which comprises precipitating silver hydroxide in an aqueous solution, dissolving the precipitate in an organic alkali, mixing the solution with an inert carrier therefor and adding an alkali metal halide to the mixture to form an emulsion, and then adding approximately 2.2%, based on the weight of inert carrier, of salt selected from the group consisting of hydroxylamine hydrochloride and hydrazine sulfate.

3. A process of producing a light-sensitive emulsion which comprises precipitating silver hydroxide in an aqueous solution, dissolving the precipitate in an organic alkali, mixing the solution with gelatin and adding an alkali metal halide to the mixture to form an emulsion, and then adding to the emulsion approximately 2.2%, based on the weight of gelatin, of a salt selected from the group consisting of hydroxylamine and hydrazine acid salts.

4. A process of producing a light-sensitive emulsion which comprises precipitating silver hydroxide in an aqueous solution, dissolving the precipitate in an organic alkali, mixing the solution with gelatin and adding an alkali metal halide to the mixture to form an emulsion, and then adding to the emulsion approximately 2.2%, based on the weight of gelatin, of a salt selected from the group consisting of hydroxylamine hydrochloride and hydrazine sulfate.

5. A process of producing a light-sensitive emulsion which comprises precipitating silver hydroxide in an aqueous solution, dissolving the precipitate in a heterocyclic nitrogen base, mixing the solution with gelatin and adding an alkali metal halide to the mixture to form an emulsion, and then adding to the emulsion approximately 2.2%, based on the weight of gelatin, of a salt selected from the group consisting of hydroxylamine hydrochloride and hydrazine sulfate.

6. A process of producing a light-sensitive emulsion which comprises precipitating silver hydroxide in an aqueous solution, dissolving the precipitate in a heterocyclic nitrogen base, mixing the solution with gelatin and adding an alkali metal halide to the mixture to form an emulsion, and then adding approximately 2.2%, based on the weight of gelatin, of hydroxylamine hydrochloride to the emulsion.

7. A process of producing a light-sensitive emulsion which comprises precipitating silver hydroxide in an aqueous solution, dissolving the precipitate in a heterocyclic hydrogen base, mixing the solution with gelatin and adding an alkali metal halide to the mixture to form an emulsion, and then adding approximately 2.2%, based on the weight of gelatin, of hydrazine sulfate to the emulsion.

8. A light-sensitive surface comprising the product resulting from the reaction of a complex solution of silver hydroxide in an organic alkali, on an alkali metal halide in the presence of an inert carrier, and containing approximately 2.2%, based on the weight of inert carrier, of a salt selected from the group consisting of hydroxylamine hydrochloride and hydrazine sulfate.

9. A photographic element comprising a cellulose ester support coated with gelatin containing the product resulting from the reaction of a complex solution of silver hydroxide in an organic alkali on an alkali metal halide, and containing approximately 2.2%, based on the weight of gelatin, of hydroxylamine hydrochloride.

10. A photographic element comprising a cellulose ester support coated with gelatin containing the product resulting from the reaction of a complex solution of silver hydroxide in an organic alkali on an alkali metal halide, and containing approximately 2.2%, based on the weight of gelatin, of hydrazine sulfate.

11. A photographic element comprising a glass support coated with gelatin containing the product resulting from the reaction of a complex solution of silver hydroxide in an organic alkali on an alkali metal halide, and containing approximately 2.2%, based on the weight of gelatin, of hydroxylamine hydrochloride.

12. A photographic element comprising a glass support coated with gelatin containing the product resulting from the reaction of a complex solution of silver hydroxide in an organic alkali on an alkali metal halide, and containing approximately 2.2%, based on the weight of gelatin, of hydrazine sulfate.

GEORGE E. FALLESEN.
BURT H. CARROLL.